United States Patent
Davis, III et al.

(10) Patent No.: US 12,155,342 B2
(45) Date of Patent: Nov. 26, 2024

(54) RAIL FRICTION STRIP FOR MECHANICALLY ENGAGING TUFTED GEOTEXTILE GROUND COVER

(71) Applicant: Watershed Geosynthetics LLC, Alpharetta, GA (US)

(72) Inventors: Carl M. Davis, III, Canton, GA (US); Kyle Ehman, Milton, GA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 0 days.

(21) Appl. No.: 17/761,179

(22) PCT Filed: Sep. 17, 2020

(86) PCT No.: PCT/US2020/051290
§ 371 (c)(1),
(2) Date: Mar. 16, 2022

(87) PCT Pub. No.: WO2021/055619
PCT Pub. Date: Mar. 25, 2021

(65) Prior Publication Data
US 2022/0368272 A1 Nov. 17, 2022

Related U.S. Application Data

(60) Provisional application No. 62/901,454, filed on Sep. 17, 2019.

(51) Int. Cl.
*H02S 20/10* (2014.01)
(52) U.S. Cl.
CPC .................................. *H02S 20/10* (2014.12)

(58) Field of Classification Search
CPC .. F24S 25/20; F24S 25/00; F24S 25/61; F24S 25/617; F24S 25/63; F24S 25/632;
(Continued)

(56) References Cited

U.S. PATENT DOCUMENTS 8,844,215 B2 * 9/2014 Wildes .................... H02S 20/30
52/173.3
9,388,547 B2 * 7/2016 Kellner ................... E02D 27/42
(Continued)

FOREIGN PATENT DOCUMENTS

DE 102013006530 A1 * 10/2014 ............... F24J 2/523
JP 2018162568 A * 10/2018 ............. Y02B 10/10
(Continued)

*Primary Examiner* — Patrick D Hawn
(74) *Attorney, Agent, or Firm* — Baker Donelson; Carl M. Davis, II (57) ABSTRACT

An elongated plate having a rail and defining lateral wings on opposing sides and a plurality of spaced-apart tabs extending below a plane defined by a bottom surface of the plate for engaging a tufted geotextile ground cover, said rail for receiving a fastener for engaging a bracket of a photovoltaic module thereto. Alternatively, a pair of U-shaped racks support adjacent photovoltaic modules in a series on a support surface, comprising a base and a pair of opposing elongated legs each having a support plate for supportingly engaging a respective one of two adjacent photovoltaic modules, and the base including spaced tabs projecting at an angle to dispose a respective distal end vertically spaced from a bottom surface of the base, for engaging a portion of the support surface.

18 Claims, 3 Drawing Sheets

(58) Field of Classification Search
CPC ...... F24S 2025/01; Y02B 10/10; Y02E 10/50;
Y02E 10/52; Y02E 10/47; H02S 30/10;
H02S 20/10; H02S 20/20
See application file for complete search history.

(56) References Cited

U.S. PATENT DOCUMENTS

| | | | | |
|---|---|---|---|---|
| 9,515,599 | B2* | 12/2016 | Franklin | H02S 20/20 |
| 9,800,200 | B2* | 10/2017 | Higuchi | H02S 30/10 |
| 10,158,321 | B2* | 12/2018 | Guthrie | H01L 31/048 |
| 10,742,164 | B2* | 8/2020 | Urrutia | H02J 3/38 |
| 10,816,240 | B2* | 10/2020 | Robinson | F24S 25/61 |
| 10,992,250 | B2* | 4/2021 | Ayers | H02S 40/22 |
| 11,031,903 | B2* | 6/2021 | Urrutia | E02D 17/202 |
| 11,277,091 | B2* | 3/2022 | Ayers | H02S 30/10 |
| 2016/0268958 | A1* | 9/2016 | Wildes | H02S 20/23 |
| 2018/0269826 | A1* | 9/2018 | Urrutia | H02J 3/38 |
| 2018/0367087 | A1* | 12/2018 | Ayers | H02S 20/20 |
| 2018/0367090 | A1* | 12/2018 | Ayers | F24S 25/33 |
| 2018/0367093 | A1* | 12/2018 | Ayers | F24S 25/61 |
| 2019/0222162 | A1* | 7/2019 | Ehman | H02S 30/10 |

FOREIGN PATENT DOCUMENTS

| | | | | |
|---|---|---|---|---|
| KR | 101632150 B1 * | 6/2016 | | H02S 20/10 |
| KR | 102265384 B1 * | 6/2021 | | H02S 20/10 |

* cited by examiner

RAIL FRICTION STRIP FOR MECHANICALLY ENGAGING TUFTED GEOTEXTILE GROUND COVER

TECHNICAL FIELD

The present invention relates to mounting systems and methods for supporting photovoltaic modules on a ground site covered by a tufted geotextile ground cover. More particularly, the present invention relates to an elongated rail system and method mechanically engaged to a tufted geogtextile ground cover system covering a ground site for supporting photovoltaic modules attached in spaced-apart relation to the rail system for solar energy generation.

In this application, the following terms will be understood to have the indicated definitions:

- waste sites—refers to earthen berms and to sites where waste is deposited, such as landfills, phosphogypsum stacks, environmentally impacted land, leach pads, mining spoils and environmental closures or material stockpiles that require a closure or cover system;
- synthetic grass—refers to a composite of at least one geotextile (woven or nonwoven) tufted or knitted with one or more synthetic yarns or strands that has the appearance of grass;
- geomembrane—refers to a conventional or textured polymeric material, such as high-density polyethylene, very low-density polyethylene, linear low-density polyethylene, polyvinyl chloride, etc.

BACKGROUND OF THE INVENTION

Photovoltaic solar modules have historically been mounted to rigid racking systems positioned in spaced relation over a variety of surfaces such as rooftops, waste sites, greenfields and brownfields. These rigid racking systems have not been integrated onto the photovoltaic module. Typical systems include racking structures that are positioned on the surface and the photovoltaic module placed upon and then mechanically fastened to the racking structure.

Racking structures are secured from movement by various devices, typically using ballast blocks that sit on ground members of the racking structure. The ballast blocks, typically cementitious blocks or elongate panels, weight the racking structure. Assembly of a photovoltaic field supported by racking structures thus involves large quantities of heavy blocks for transport and delivery to a land site with on-site heavy lifting and positioning of the blocks using manpower and lifting equipment such as front-end loaders having grapple arms or extending forks.

While use of photovoltaic modules for solar energy generation as a renewable alternative energy source has "clean energy" favorabilities, there are drawback to such installations. Solar energy generation sites typically require large tracts of land. In some location circumstances, wooded lands are cleared or farmlands are re-purposed for use as solar energy generation sites. These large acreage sites typically are sloped or "rolling" with hills and valley areas. Often sites are significantly remote from tie-in connections to the power transmission and distribution grid of power generating and supply companies. These remote sites require capital expenditures to install and maintain transmission lines to the electrical grid and such transmission lines occupy additional land. Also, recent changes in power generation capacity has decreased reliance on coal and increased reliance on cleaner combustion fuels such as natural gas and, alternatively, power plants that generate electricity with turbines operated with steam heated by nuclear fuel sources. The coal-fired power plants nevertheless have large areas of ash holding ponds or storage areas. These areas are subject to closing with covers such as geomembranes that restrict environmental waters, such as rain or other precipitation or surface water flow, from passing through the covered site and leaching into the ground or pond. These sites may also be covered with artificial grass covers such as tufted geotextiles to simulate green fields while minimizing required maintenance of periodic grass cutting, tree removal, and such.

Often the closed waste-containing land sites are covered with the geomembrane and tufted geotextile closure systems noted above. Such sites often have steeply sloped surfaces created as waste is deposited in cells that over time are formed on upper surface across the site. The waste site thus tends to fill vertically but with sides that taper inwardly while receiving additional waste material and thereby creating steep side slopes. Racking systems are difficult to install on such sites, yet covered sites such as those at power generation facilities may have beneficial mechanical and cost-reducing proximity to tie-in connections for power grid electric distribution systems.

There is a need in the solar industry for a mounting system readily usable on large area sites particularly non-traditional sites such as those closed with geomembrane/geotextile cover closure systems for supporting photovoltaic modules for solar energy generation, which provides a secure supporting system for large panel photovoltaic modules yet has economic advantages to the use of labor-intensive rigid racking systems requiring large quantities of materials and labor-intensive installation while allowing flexibility of installation by using non-traditional racking installers, thereby increasing the potential generation of electrical power.

Accordingly, there is a need in the art for an improved mounting system for securing photovoltaic modules over large area sloped surfaces for generating solar power. It is to such that the present invention is directed.

SUMMARY OF THE INVENTION

The present invention meets the need in the art for a mounting system for securing photovoltaic modules over large area sloped surfaces for generating solar power, which mounting system and method mechanically engages a surface and supports the attached photovoltaic for electrical power generation.

More particularly, the present invention in a first aspect provides a support for photovoltaic modules disposed on a land site, comprising an elongated mounting device having a central rail extending from a friction plate to define opposing lateral plates that each have a plurality of spaced-apart depending tabs for mechanically engaging the surface. In a preferred embodiment, the tabs of the mounting system mechanically engage the plurality of tufts of a tufted geotextile cover system overlying a land surface and the photovoltaic module attaches with fasteners to the rail of the mounting system.

In that aspect, the present invention provides a support for photovoltaic modules disposed on a land site, comprising an elongated plate having a rail extending from a first surface intermediate opposing sides and defining lateral wings on opposing sides of the rail, said wings defining a plurality of spaced-apart tabs extending at an angle in a first direction below a plane defined by a bottom surface of the plate for engaging a tufted geotextile ground cover overlying a land site, wherein each of the plurality of spaced-apart tabs is defined by a U-shaped slot formed in the respective wing to separate a portion bendable at a connection therewith for disposing a distal end of the tab outwardly of the bottom surface of the wing, said rail for receiving a fastener for engaging a bracket of a photovoltaic module thereto.

In another aspect, the present invention provides a method of supporting a photovoltaic module disposed on a land site, comprising the steps of:

(a) disposing a pair of elongated plates on a tufted geosynthetic ground cover system having a plurality of synthetic grass tufts extending therefrom, said elongated plates having a rail extending from a first surface intermediate opposing sides and defining lateral wings on opposing sides of the rail, said wings defining a plurality of spaced-apart tabs extending at an angle in a first direction below a plane defined by a bottom surface of the plate for engaging respective ones of the tufts of the tufted geotextile ground cover, each of the plurality of spaced-apart tabs is defined by a U-shaped slot formed in the respective wing to separate a portion bendable at a connection therewith for disposing a distal end of the tab outwardly of the bottom surface of the wing;

(b) placing a photovoltaic module onto an upper surface of the rail of the respective opposing plates; and (c) engaging into the rails a respective fastener of a plurality of brackets for securing the photovoltaic module to the rail.

In a second aspect, the present invention provides a racking system for supporting adjacent spaced photovoltaic panels on a support surface for generation of electrical current upon exposure to ambient light. The racking system comprises a pair of racks for disposing in spaced relation on a support surface, each rack comprising a U-shape member having a base and a pair of opposing elongated legs extending therefrom. The legs each have a support plate extending therefrom for supportingly engaging a respective one of two adjacent photovoltaic modules. The base includes a plurality of spaced tabs projecting from the base at an angle to dispose a respective distal end vertically spaced from a bottom surface of the base, for engaging a portion of the support surface. Each of the plurality of tabs is defined by a U-shaped slot formed in the base to separate a portion bendable at a connection therewith for disposing a distal end of the tab outwardly of the bottom surface of the base.

In yet another aspect, the present invention provides a method for supporting adjacent spaced photovoltaic panels on a support surface for generation of electrical current upon exposure to ambient light, comprising the steps of:

(a) attaching a pair of racks to opposing sides of adjacent spaced first and second photovoltaic modules, said racks each comprising a U-shape member having a base and a pair of opposing elongated legs extending therefrom and said legs each having a support plate extending therefrom, a first of the pair of opposing legs attached to a leading edge of the first photovoltaic module and a second of the pair of opposing legs attached to a trailing edge of the second photovoltaic module, said base having a plurality of tabs projecting from the base at an angle, each said tab defined by a U-shaped slot formed in the base to separate a portion bendable at a connection therewith for disposing a distal end of the tab outwardly of the bottom surface of the base; and (b) disposing the base of the rack with the plurality of spaced tabs in engagement with respective tufts of a tufted geosynthetic ground cover system having a plurality of spaced-apart synthetic tufts of grass extending therefrom angle to dispose a respective distal end vertically spaced from a bottom surface of the base.

In another aspect, the present invention provides a method for supporting a photovoltaic panel on a support surface for generation of electrical current upon exposure to ambient light, comprising the steps of:

(a) disposing a pair of racks in spaced-apart relation on a tufted geosynthetic ground cover having a plurality of spaced-apart synthetic tufts of simulated grass extending therefrom, and overlying a support surface, said racks each comprising a U-shape member having a base and a pair of opposing elongated legs extending therefrom and said legs each having a support plate extending therefrom, said base having a plurality of tabs projecting from the base at an angle, each said tab defined by a U-shaped slot formed in the base to separate a portion bendable at a connection therewith for disposing a distal end of the tab outwardly of the bottom surface of the base, said tabs engaging respective tufts of the plurality of tufts of the tufted geosynthetic ground cover; and (b) attaching a side edge of a photovoltaic module to a respective support plate of each of the pair of racks, whereby the pair of racks support the attached photovoltaic module spaced from the tufted geosynthetic ground cover.

Objects, advantages, and features of the present invention may be readily ascertained upon a reading of the detailed description in view of the drawings.

DETAILED DISCUSSION

Figure 1:
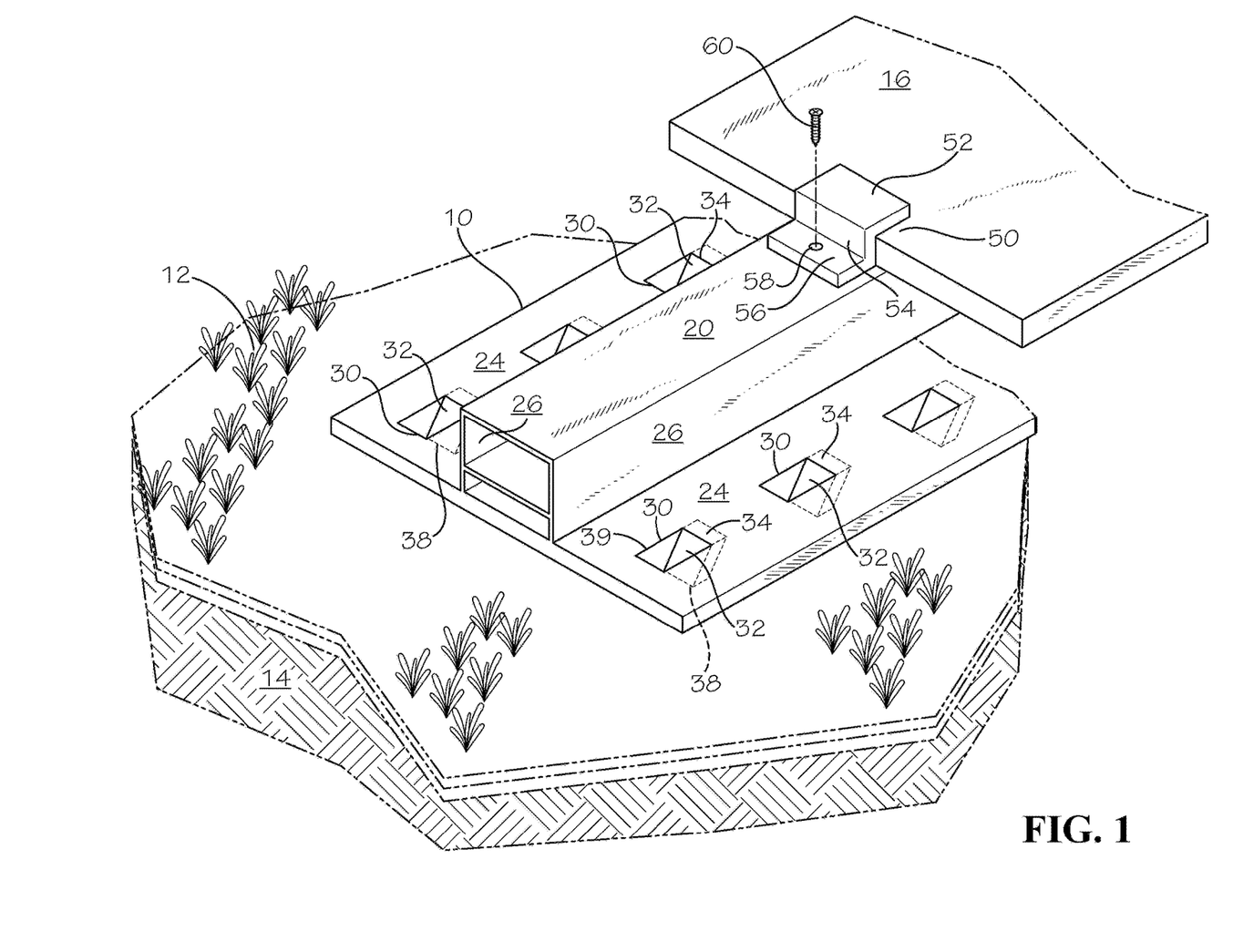
FIG. 1 illustrates in perspective view an elongated rail that supports a photovoltaic module which rail mechanically engages a tufted geotextile cover system overlying a ground surface for supporting the photovoltaic module for generation of electrical power, in accordance with the present invention.

With reference to the drawings, in which like parts have like identifiers, FIG. 1 illustrates in perspective view an elongated support member generally 10 mechanically engaged to a tufted geotextile cover system 12 overlying a land surface 14 to support a photovoltaic module 16 for generation of electrical power, in accordance with the present invention. The elongated support member 10 comprises a central rail 20 extending from a friction plate 22 that defines wings 24 lateral of the sides 26 of the central rail. The rail in the illustrated embodiment comprises the opposing side walls 26 and a top plate 27. Each of the wings 24 includes a plurality of spaced-apart openings 30 that define extending members 32 such as tabs, stubs, fingers, or barbs, (hereinafter, tabs 32) extending from a connection portion 34 of the friction plate 22. The tabs 32 are bendable to an oblique angle relative to the friction plate 22 to extend a respective free distal end 38 downwardly below a plane defined by a bottom surface of the friction plate.

The support member 10 may be an elongate extrusion. The openings 30 may be defined by a cutting means or devices configured for forming a slot 39 for a shaped tab in the wing 24. Such cutter includes but not limited to laser jet, water jet, press die for cutting and then bending the defined tab, or subsequent to cutting the slot a plunger that then bears forcibly centrally of the shaped portion in the wing separated by the cut slot to bend or deform the tab 32 downwardly at the connection portion 34 relative to the friction plate 22 to dispose the distal end 38 below the plane of the bottom of the friction plate 22. The illustrated tab 32 is rectangular, but may have other shape such as a T-shape, an X-shape, or other. The support member 10 may be made of an extrudable material such as plastic or metal such as aluminum.

The tufted geotextile system 12 comprises at least a tufted geosynthetic cover 40 having a backing sheet 42 tufted with yarns to define a plurality of simulated grass tufts 44 extending from the backing sheet. The geosynthetic cover 40 comprises a fabric (woven or non-woven) tufted with yarn tufts. The tabs 32 of the friction plate 22 engage respective tufts 44 of the tufted geotextile system 12 for mechanical engagement of the support member 10 to the tufted geotextile system.

The geosynthetics ground cover system 12 may include an impermeable geomembrane 46 that covers a large ground surface area for restricting inflow of ambient ground surface water below grade and the tufted geosynthetic cover 40 that overlies the geomembrane. As used herein, "tufted geosynthetics" refers to a cover system which is generally comprised of a synthetic grass of a geotextile or fabric backing sheet having synthetic fibers tufted to define simulated grass blades extending from the backing, and may include the geomembrane and which is adapted to cover waste sites and other environmental closures. Examples of a tufted geosynthetic cover systems are shown in Ayers and Urrutia U.S. Pat. Nos. 7,682,105 and 9,163,375. Examples of landfill covers useful in the solar energy system of this invention are the covers marketed by Watershed Geosynthetics LLC under the registered trademarks ClosureTurf and VersaCap. These covers comprise a composite of at least one geotextile which is tufted with one or more synthetic yarns (i.e., a tufted geosynthetic) and an impermeable geomembrane which is comprised of a polymeric material.

A bracket 50 attaches to the photovoltaic module 16 and receives a fastener to secure the photovoltaic module to the rail 20 for secure support. In the illustrated embodiment, the bracket 50 includes a top plate 52 extending laterally from a side plate 54 and a connector plate 56 extends laterally from the side plate 50 in a direction opposing the extending top plate 52. The connector plate 56 defines an opening 58 for receiving a fastener 60 to secure the bracket 50 to the rail 12. The bracket 50 may be pre-attached to the photovoltaic module. Alternatively, the photovoltaic module may have a frame that holds the solar active panel, and a flange may extend laterally from a side member of the frame. The fastener 60 extends through the flange and engages the rail 12 to secure the photovoltaic module to the support member.

Figure 2:
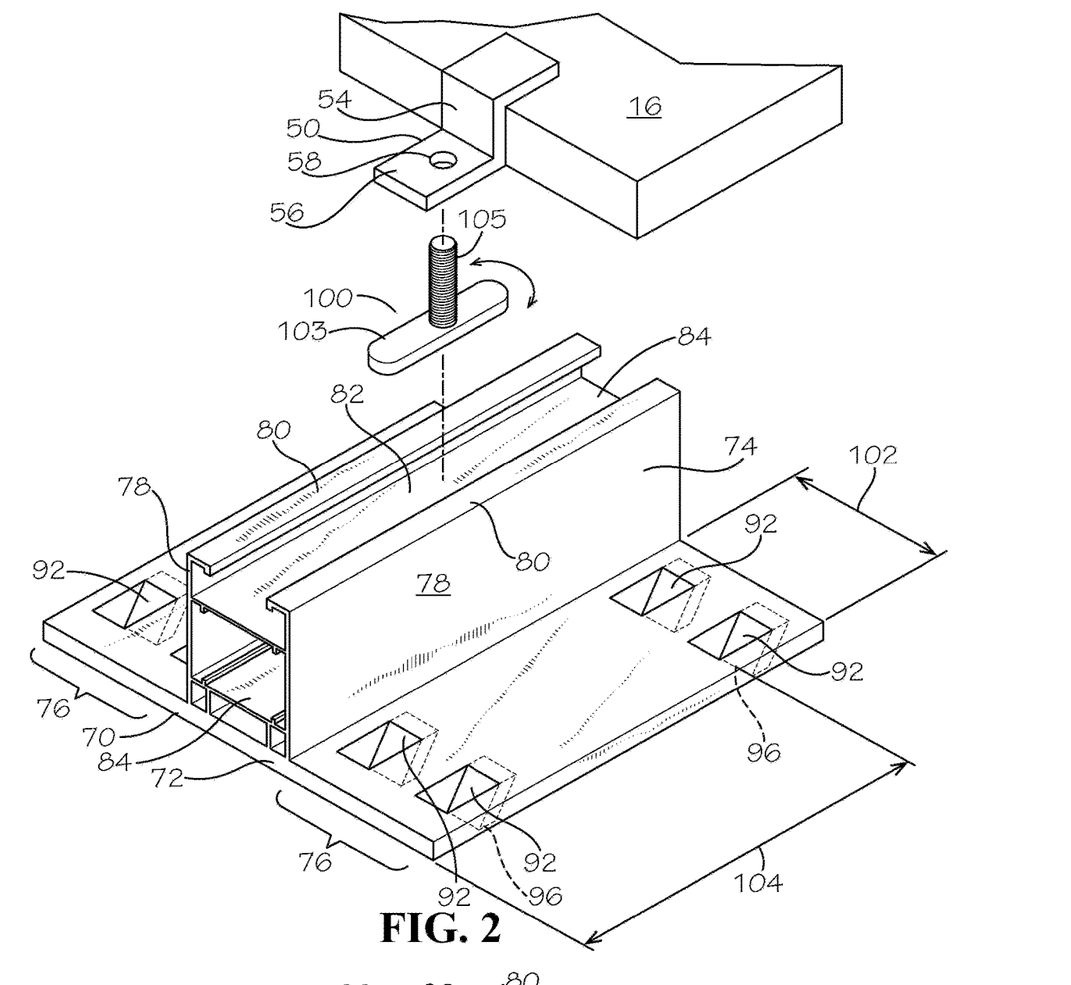
FIG. 2 illustrates in perspective view an alternate embodiment of the elongated rail for mechanically engaging a tufted geotextile cover system illustrated in FIG. 1.
Figure 3:
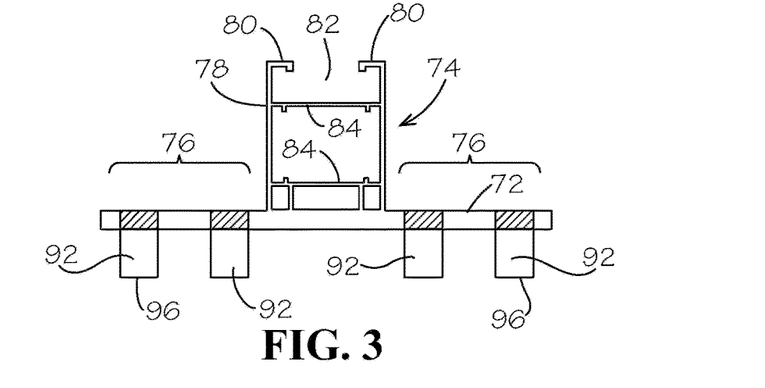
FIG. 3 illustrates in end elevational view the elongated rail shown in FIG. 2.

FIG. 2 illustrates in perspective view an alternate embodiment of a support member 70 having a friction plate 72 from which an elongate central rail 74 extends. FIG. 3 illustrates in end elevational view the elongated rail 74 and friction plate 72 which may be an extrusion. The central rail 74 preferably is medial opposing sides of the friction plate 72 but there may be applications for which the central rail is offset relative to one side then the other and thus the central rail is positioned intermediate the opposing sides. The friction plate 72 defines the pair of opposing wings 76 lateral of opposing sides 78 of the central rail 74. The sides 78 in this embodiment extend upwardly to distal ends that each have an inwardly extending lip 80. The opposing lips 80 define a central slot 82. The illustrated embodiment includes a pair of spaced-apart transverse support plates 84 extending between the opposing sides 78.

Each of the wings 76 includes a plurality of spaced-apart openings 90 that define tabs 92 extending from a respective portion 94 of the friction plate 72. The tabs 92 are formed as explained above for the tabs 32, with a U-shaped slot cut in the wings. The tabs 92 are bendable at the portion 94 to an oblique angle relative to the plate to extend a respective free distal end 96 downwardly below a plane defined by a bottom surface of the friction plate 72. In this embodiment, the wings 76 define a plurality of spaced sets 102 of pairs of tabs 92, which sets are spaced-apart longitudinally 104. The spaced pairs of tabs 92 mechanically engage the tufts 44 of the tufted geotextile cover system 12 illustrated in FIG. 1. For applications that install the support member 70 over open or natural turf ground surface, the tabs 92 dig into the ground surface and resist movement.

FIG. 2 further illustrates an alternate fastener 100 having an elongated mounting plate 103 and an externally threaded mounting post 105 that extends through the opening 58 in the bracket 50 for securing the photovoltaic module 16 to the rail 74. The width of the mounting plate 103 is less than the width of the central slot 82 while the length of the mounting plate 103 is greater than the width of the central slot 82. The mounting plate 103 may be passed widthwise through the central slot 82 (with the longitudinal axis of the mounting plate aligned with the longitudinal axis of the slot 82). The mounting plate 103 is then rotated so that the mounting plate then cannot pass back through the central slot 82. The longitudinal ends of the mounting plate engage contactingly on the interior walls of the sides 78. The corners of the mounting plate 103 may be rounded for bearing against the interior surface of the side walls 78.

The fastener 100 secures the bracket 50-engaged photovoltaic module 16 to the rail 74. The photovoltaic module 16 is placed on the rail 74 with the bracket 50 adjacent the edge, so the connector plate 56 is on the rail and the plate 52 over a portion of the photovoltaic panel 16. The mounting plate 103 inserts widthwise through the central slot 82 into the rail 74 outwardly of the photovoltaic module 16. The mounting plate 103 sits on the upper plate 84 and the threaded mounting post 105 extends upwardly past the lips 80. The mounting post 105 is rotated while also moved longitudinally under the connector plate 56 for inserting the mounting post 105 through the opening 58. (The side of the photovoltaic module 16 may need to be lifted slightly for inserting the mounting post 105 through the opening 58.) A nut threads on the extending mounting post and as the nut is tightened, the mounting plate 102 moves upwardly against a bottom of the opposing lips 80, to secure the photovoltaic module 16 to the rail.

Figure 4:
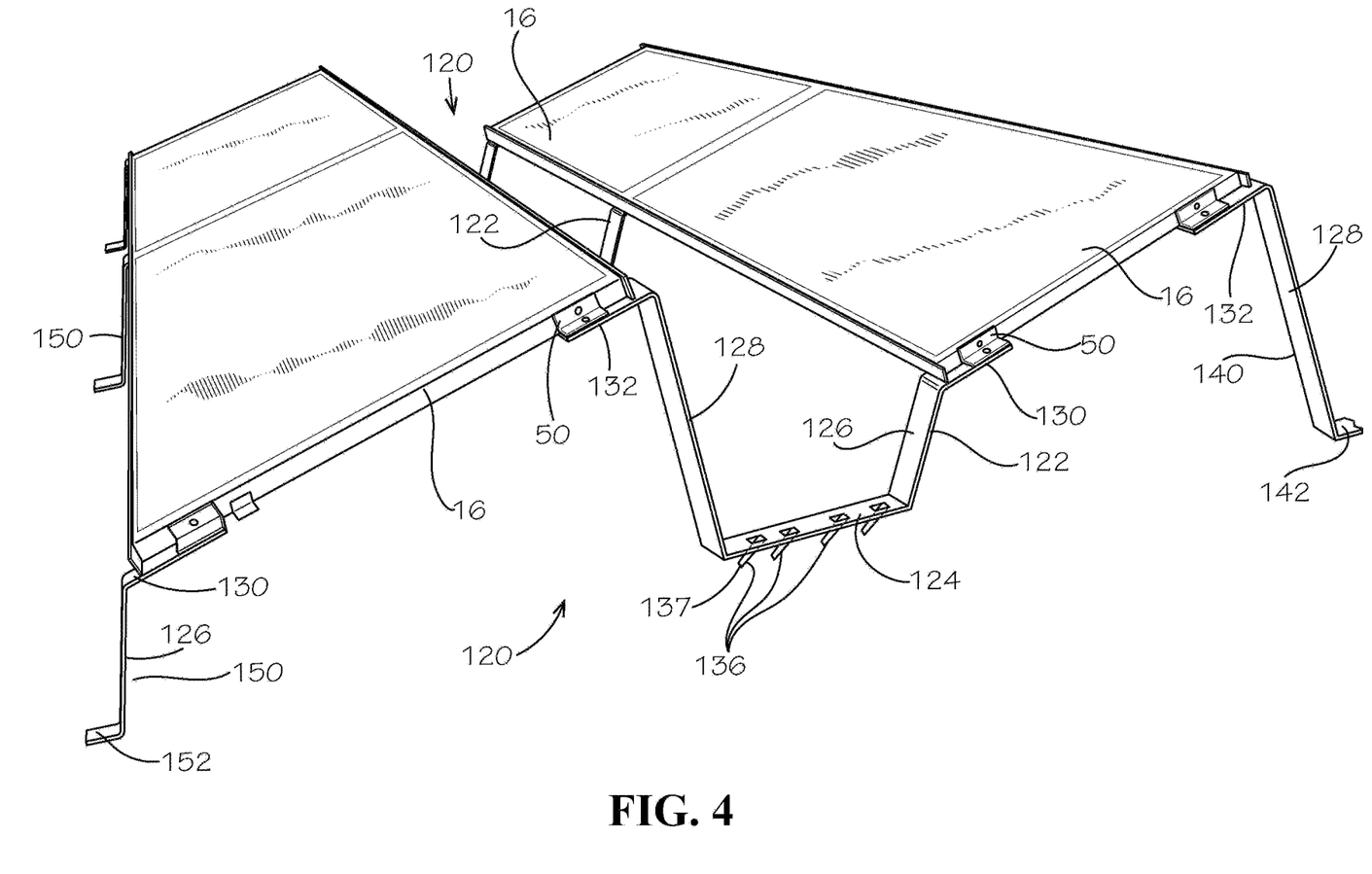
FIG. 4 illustrates in side perspective view a racking system for supporting photovoltaic modules for generation of electrical power.

FIG. 4 illustrates in side perspective view a racking system 120 for supporting adjacent photovoltaic modules 16 in a series for generation of electrical power. The racking system 120 comprises at least a pair of members or racks 122. The illustrated rack 122 defines a general U-shape having a base portion 124 with a first leg 126 extending at an angle relative to the base and a second leg 128 extending at a second angle relative to the base. In the illustrated embodiment, the legs 126, 128 angle away from each other. The first leg 126 and the second leg 128 each terminate in a respective plate 130, 132 extending from a distal end. In the illustrated embodiment, the plates 130, 132 extend in opposing directions away from the base. In an alternate embodiment, the support plates 130, 132 extend towards the opposing support plate to be positioned vertically above the base. In the illustrated embodiment, the support plates 130, 132 are disposed at an angle for orienting the photovoltaic module relative to the sun. While the first leg and the second leg may have the same length, the illustrated embodiment illustrates the first leg 126 having a first length and the second leg 128 having a second length longer than the first length. This difference in leg lengths enables the photovoltaic modules 16 to be orientated at an angle relative to the sun. The plate 130 connects to a first photovoltaic module 16 and the plate 132 connects to a second photovoltaic module adjacent the first photovoltaic module.

The base portion 124 of the rack 122 defines a plurality of spaced tabs 136. The tabs 136 are formed by cutting a slot in a U-shape slot, and bending a U-shaped portion of the base portion 124 downward at a connection 137 relative to the base to dispose a distal end 139 below a plane defined by a bottom surface of the base portion. The U-shaped slot formed in the base thus separates a portion that is bendable at a connection with the base 124 for disposing the distal end 139 of the tab 136 outwardly of the bottom surface of the base.

As shown in FIG. 2, a leading one of the series of photovoltaic module 16 is supported at an opposing end by separate leading end rack members 140. The leading end rack member 140 comprises a portion of the rack 122 including the leg 128, a portion of the base 124 for a foot 142 (including but not shown the projecting tabs 136), and the support plate 132. The foot 142 seats on the ground cover 12 and the plate 132 supports the leading edge of the photovoltaic module 16. A trailing one of a series of photovoltaic modules is supported by separate trailing end rack members 150. The trailing end rack member 150 comprises a portion of the rack 122 including the leg 126, a portion of the base 124 for a foot 152 (including but not shown the projecting tabs 136), and the support plate 130. The foot 152 seats on the ground cover 12 and the plate 130 supports the tailing edge of the photovoltaic module 16. The length of the arm 128 of the leading end rack member 140 is greater than the length of the arm 126 of the trailing end rack member 150, to maintain the photovoltaic module 16 at an angle relative to the ground cover 12. The rack 122 thus is readily configurable with a respective portion for supporting a respective first or last one of a plurality of the photovoltaic modules 16 disposed in a longitudinal series on the support surface.

With reference to FIG. 4, a series of photovoltaic modules 16 connect to the rack members 122 in series across a ground surface. A first photovoltaic module in the series is supported at the trailing edge by the pair of trailing end rack members 150 while the last photovoltaic module in the series is supported at the leading edge by the pair of leading end rack members 140.

The trailing end rack members 150 attach on opposing sides of the photovoltaic module 16 with fasteners and brackets to the respective plates 130 at the trailing end of the first photovoltaic module. The leading end of the first photovoltaic module connects to opposing pairs of the racks 122 on opposing sides. The leading end attaches with fasteners and brackets to the plate 132. The next adjacent photovoltaic module 16 attaches at its leading edge to the respective plates 130 of the opposing racks 122 connected to the first or adjacent photovoltaic module. Subsequent adjacent photovoltaic modules 16 are similarly installed to opposed pairs of the racks 122. A final photovoltaic module in a series of modules attaches to a pair of the leading end rack members 140.

As shown in FIG. 4, the opposing racks 122 attached to opposing first (trailing) side and second (leading) side of adjacent photovoltaic modules 16, support the photovoltaic modules at an angle relative to the on a ground surface while the projecting tabs engage tufts of the tufted ground cover system 12, which racks attach with brackets and fasteners that secure the photovoltaic modules to the respective plates 130, 132. The tabs 136 engage the tufts 44 of the tufted geotextile cover system 12 for resisting wind-uplift of the photovoltaic modules.

In an alternate embodiment, a separate elongated member is provided with the tabs 136 and the base member 124 does not include the depending tabs. Rather, the separate elongated member rigidly secures with fasteners to the base portion 124 on a bottom side with the tabs 136 of the separate member extending away from the base portion. The tabs 136 thereafter engage the tufts 44 of the tufted geotextile cover system 12 or engage the ground surface of an uncovered ground site.

With reference to FIG. 1, the support members 10 are disposed on a tufted ground cover system with the tabs 136 projecting in a direction towards the downhill portion of the slope of a down-hill incline. In this way, the tabs engaged with the tufts further resist downward movement of the attached photovoltaic module. The cooperative engagement of the tabs with the tufts resists wind uplift of the spaced photovoltaic modules, which wind flows underneath the photovoltaic modules and upwardly through spacing gaps between adjacent photovoltaic modules.

An elongated support member for mechanically engaging a ground cover system or ground surface, comprising an elongated friction plate having a rail extending from an upper surface and opposing portions of the friction plate that extend laterally from the sides of the rail define a plurality of spaced-apart tabs that each extend downwardly to a distal end spaced from a bottom surface of the friction plate, whereby being disposed on a tufted geotextile ground cover system or on ground surface the tabs mechanically engage the tufts or the ground surface to secure the support member thereto.

The foregoing further discloses a racking system for supporting adjacent spaced photovoltaic panels on a support surface for generation of electrical current upon exposure to ambient light. The racking system comprises a pair of racks for disposing in spaced relation on a support surface. Each rack comprises a U-shape member having a base and a pair of opposing elongated legs extending therefrom, and said legs each having a support plate extending therefrom for supportingly engaging a respective one of two adjacent photovoltaic modules. The base including a plurality of spaced tabs projecting from the base at an angle to dispose a respective distal end vertically spaced from a bottom surface of the base, for engaging a portion of the support surface.

The foregoing discloses illustrative embodiments of support members with projecting tabs for engaging tufted geotextiles of ground cover systems for securing electrical current generating photovoltaic modules or panels over land surfaces, but variations and modifications can be made without departing from the spirit and scope of the invention.

What is claimed is:

1. A support for photovoltaic modules disposed on a land site, comprising an elongated plate having a rail extending from a first surface intermediate opposing sides and defining lateral wings on opposing sides of the rail, said wings defining a plurality of spaced-apart tabs extending at an angle in a first direction below a plane defined by a bottom surface of the plate for engaging a tufted geotextile ground cover overlying a land site, wherein each of the plurality of spaced-apart tabs is defined by a U-shaped slot formed in the respective wing to separate a portion bendable at a connection therewith for disposing a distal end of the tab outwardly of the bottom surface of the wing, said rail for receiving a fastener for engaging a photovoltaic module thereto.

2. The support as recited in claim 1, wherein said plurality of tabs are longitudinally aligned in spaced-apart relation on the respective opposing wings.

3. The support as recited in claim 1, wherein said plurality of tabs are disposed in paired spaced relation in said respective opposing wings and said pairs are spaced apart longitudinally.

4. The support as recited in claim 1, wherein said rail comprises a pair of opposing side walls extending from the plate and a top plate for receiving the fastener therein.

5. The support as recited in claim 1, wherein said plate and rail comprise a unitary extrusion.

6. The support as recited in claim 1, wherein said rail comprises a pair of opposing side walls extending from the plate and a pair of laterally opposing flanges extending inwardly to define a slot therebetween.

7. The support as recited in claim 6, wherein the fastener comprises:
an elongated plate having a width less than a distance between the pair of laterally opposing flanges for passing therebetween into the rail; and
a threaded member extending from a surface for passing through an opening in the bracket and receiving a nut thereon for securing the bracket to the rail by the plate bearing against the pair of laterally opposing flanges.

8. The support as recited in claim 1, further comprising a bracket engaged to the fastener for coupling the photovoltaic module to the rail.

9. A method of supporting a photovoltaic module disposed on a land site, comprising the steps of:
(a) disposing a pair of elongated plates on a tufted geosynthetic ground cover system having a plurality of synthetic grass tufts extending therefrom, said elongated plates having a rail extending from a first surface intermediate opposing sides and defining lateral wings on opposing sides of the rail, said wings defining a plurality of spaced-apart tabs extending at an angle in a first direction below a plane defined by a bottom surface of the plate for engaging respective ones of the tufts of the tufted geotextile ground cover, each of the plurality of spaced-apart tabs is defined by a U-shaped slot formed in the respective wing to separate a portion bendable at a connection therewith for disposing a distal end of the tab outwardly of the bottom surface of the wing;
(b) placing a photovoltaic module onto an upper surface of the rail of the respective opposing plates; and
(c) engaging into the rails a respective fastener of a plurality of brackets for securing the photovoltaic module to the rail.

10. The method as recited in claim 9, further comprising the step of forming the plurality of tabs in longitudinally aligned spaced-apart relation on the respective opposing wings.

11. A racking system for supporting adjacent spaced photovoltaic panels on a support surface for generation of electrical current upon exposure to ambient light, comprising:
a pair of racks for disposing in spaced relation on a support surface, each rack comprising a U-shape member having a base and a pair of opposing elongated legs extending therefrom, said legs each having a support plate extending therefrom for supportingly engaging a respective one of two adjacent photovoltaic modules;
said base including a plurality of spaced tabs projecting from the base at an angle to dispose a respective distal end vertically spaced from a bottom surface of the base, for engaging a portion of the support surface,
wherein each of the plurality of tabs is defined by a U-shaped slot formed in the base to separate a portion bendable at a connection therewith for disposing a distal end of the tab outwardly of the bottom surface of the base.

12. The racking system as recited in claim 11, wherein said respective support plates extend in opposing directions to free distal ends.

13. The racking system as recited in claim 11, wherein said respective support plates extend a same angle from the legs.

14. The racking system as recited in claim 11, wherein a first leg of the pair of opposing legs has a first length and a second leg of the pair of opposing legs has a second length different from the first length.

15. The racking system as recited in claim 11, further comprising a support member for engaging an edge portion of photovoltaic module, said support member having a leg with a foot extending from a first end and a support plate extending from an opposing end, for supporting a respective first or last one of a plurality of the photovoltaic modules disposed in a longitudinal series.

16. A method for supporting adjacent spaced photovoltaic panels on a support surface for generation of electrical current upon exposure to ambient light, comprising the steps of:
(a) attaching a pair of racks to opposing sides of adjacent spaced first and second photovoltaic modules, said racks each comprising a U-shape member having a base and a pair of opposing elongated legs extending therefrom and said legs each having a support plate extending therefrom, a first of the pair of opposing legs attached to a leading edge of the first photovoltaic module and a second of the pair of opposing legs attached to a trailing edge of the second photovoltaic module, said base having a plurality of tabs projecting from the base at an angle, each said tab defined by a U-shaped slot formed in the base to separate a portion bendable at a connection therewith for disposing a distal end of the tab outwardly of the bottom surface of the base; and
(b) disposing the base of the rack with the plurality of spaced tabs in engagement with respective tufts of a tufted geosynthetic ground cover system having a plurality of spaced-apart synthetic tufts of grass extending therefrom.

17. A method for supporting a photovoltaic panel on a support surface for generation of electrical current upon exposure to ambient light, comprising the steps of:
(a) disposing a pair of racks in spaced-apart relation on a tufted geosynthetic ground cover having a plurality of spaced-apart synthetic tufts of simulated grass extending therefrom, and overlying a support surface, said racks each comprising a U-shape member having a base and a pair of opposing elongated legs extending therefrom and said legs each having a support plate extending therefrom, said base having a plurality of tabs projecting from the base at an angle, each said tab defined by a U-shaped slot formed in the base to separate a portion bendable at a connection therewith for disposing a distal end of the tab outwardly of the bottom surface of the base, said tabs engaging respective tufts of the plurality of tufts of the tufted geosynthetic ground cover; and (b) attaching a side edge of a photovoltaic module to a respective support plate of each of the pair of racks, whereby the pair of racks support the attached photovoltaic module spaced from the tufted geosynthetic ground cover.

18. The method as recited in claim 17, further comprising the steps of:

disposing a second pair of racks on the tufted geosynthetic ground cover and each of the second pair of racks aligned longitudinally with a respective one of the pair of racks; and attaching an opposing side of the photovoltaic module to a respective support plate of the second pair of racks.

* * * * *